June 24, 1958
M. BOBRICK ET AL
2,840,691
RECESSED LIGHTING FIXTURE
Filed Jan. 11, 1957
2 Sheets-Sheet 1
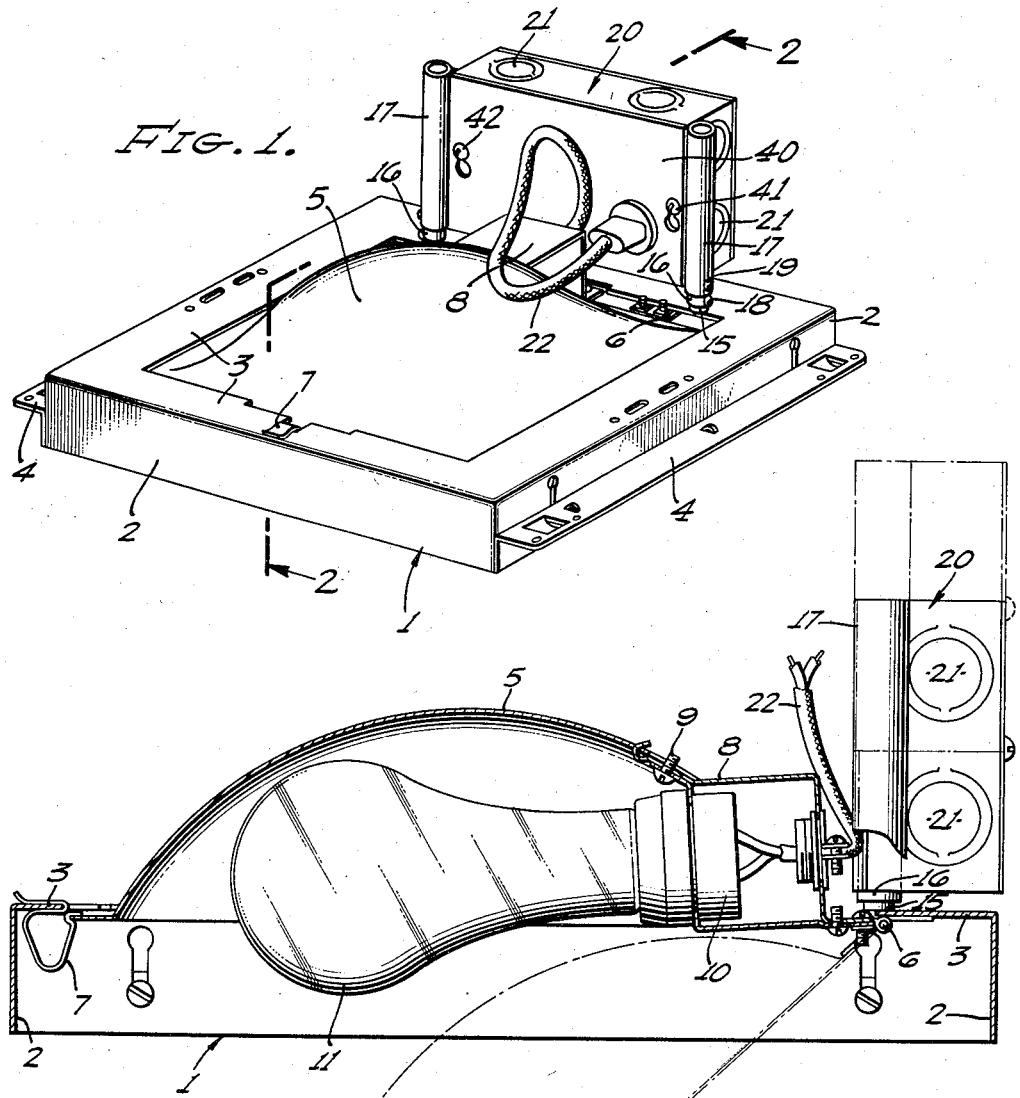
FIG. 1.
FIG. 2.
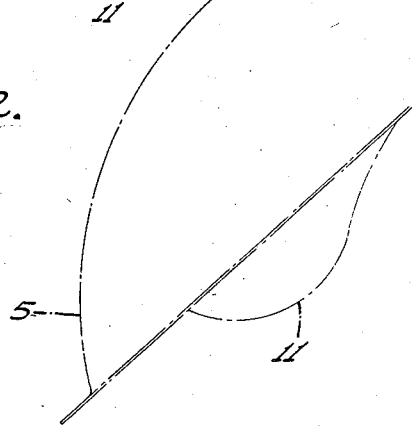
INVENTORS
MITCHELL BOBRICK
JEROME H. FEIG
BY
ATTORNEYS

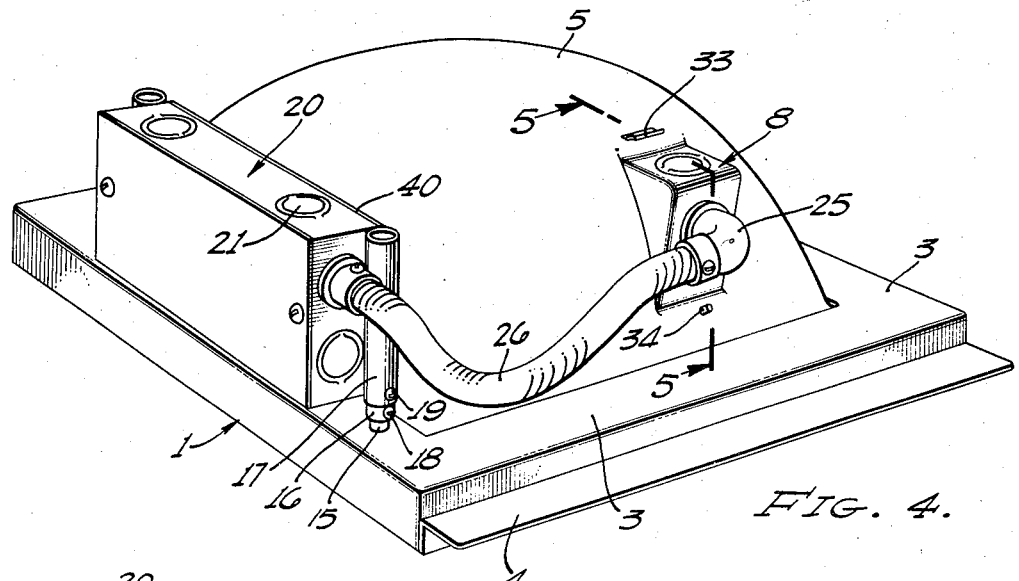
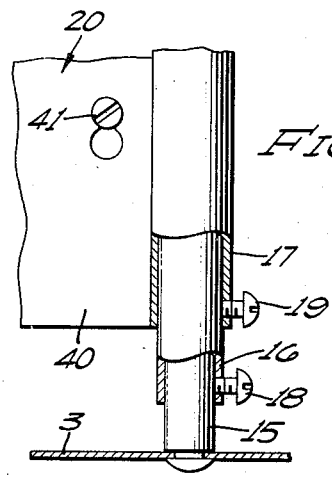
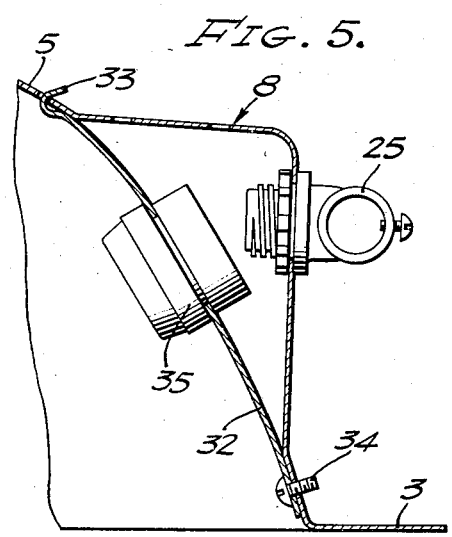
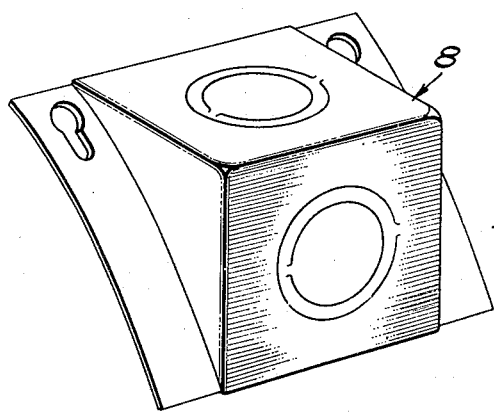

United States Patent Office 2,840,691
Patented June 24, 1958

2,840,691

RECESSED LIGHTING FIXTURE

Mitchell Bobrick, Pacific Palisades, and Jerome H. Feig, North Hollywood, Calif., assignors to Marvin Electric Manufacturing Company, Los Angeles, Calif., a corporation of California Application January 11, 1957, Serial No. 633,765

3 Claims. (Cl. 240—78)

The present invention comprises a recessed lighting fixture and, more specifically, it is an electric light fixture which is recessed in a ceiling or walls of a room. In general, the present invention comprises a fixture having a plaster frame and a bezel which fits over said plaster frame. Hingeably attached to the plaster frame is a reflector in which is mounted the electric light bulb. The reflector is adapted to drop from the horizontal to a vertical position. Mounted atop the plaster frame are telescopic posts carrying a junction box. The socket for the light bulb is positioned in an outlet box set into and attached to the reflector. A flexible connection is provided from the junction box to the outlet box and the light socket.

The purpose of this invention is to make as shallow a container as possible for the electric light bulbs so that they can be mounted where there is very little room above the ceiling.

Another object of this invention is to provide an adaptable fixture which can be used in many situations. Many city and county codes provide that the only two 90° bends can be made in any one of the protective conduits used to lead the electric wiring to the fixture. Where there is a deep stud and if the junction box on the fixture was attached closely to the fixture, it would require an extra 90° bend. By using the present invention, this 90° bend can be prevented as the junction box can be raised on telescopic posts until it is up at the level where the conduit comes over or through the stud. Of course, if the conduit comes down at the bottom of the stud, then the junction box is mounted closely to the plaster frame.

Another object of the present invention is to permit ready access for wiring up the junction box from the outside of the fixture after the fixture has been placed in position. This is accomplished by opening the reflector which drops into a vertical position on its hinges so that a workman then has ready access to the junction box for repairs or for wiring the same.

Other objects and advantages of the present invention will be apparent from the following discription of the preferred embodiment thereof when read in connection with the accompanying drawings:

In the drawings:

Figure 1 is a perspective view;
Figure 2 is a section taken on line 2—2 on Figure 1;
Figure 3 is a fragmentary section of a detail;
Figure 4 is a perspective of a modification;
Figure 5 is a section taken on the line 5—5 on Figure 4; and,
Figure 6 is a perspective view of a modification.

A recessed lighting fixture constructed in accordance with this invention comprises a plaster frame 1, which can be square as shown in the drawings, or could be any other geometric configuration. The plaster frame 1 comprises the downward extending sides 2 and the inwardly extending flanges 3. Upon at least two of the sides 2 preferably oppositely positioned are attached the angles 4 for attaching the plaster frame to the ceiling. An arcuate reflector 5 has hinges 6 attached at one side. The other ends of the hinges 6 are attached to one of the flanges 3. The reflector 5 closes the open space formed by the flanges 3. The hinges 6 are so constructed as to allow the reflector 5 to swing into a vertical position and drop downwardly through the plaster frame 1. To secure the reflector 5 in its operating position, any type latch such as that illustrated at 7 can be used to engage the flange 3 and maintain the reflector 5 in a horizontal position. Reflector 5 has adjacent to the hinges 6 an outlet box 8. This outlet box can be stamped out from the reflector as shown in Figure 4, or can be a box-like form as shown in Figures 2 and 6 which is bolted or otherwise attached as shown at 9 to the reflector 5. A light bulb socket 10 is attached to the inner wall of the outlet box 8 to receive the light bulb 11.

Posts 15 are attached to one of the flanges 3 and the telescoping members 16 and 17, with set screws 18 and 19, are placed upon post 15. Attached to the telescoping members 17 is an ordinary junction box 20 with its usual knockout holes 21. The junction box 20 receives connections from the lighting conduits. In the junction box 20 a metallic flexible cable 22 can be connected to the house wiring while the other end is connected to the socket 10. It should be noted that by this arrangement the light socket 10 and outlet box 8 are spaced from the junction box 20 so heat from the fixture, caused by the light 11, is insulated from the junction box 20.

In some constructions, it is desirable to use the flexible electric cable known as BX cable. Such a use is shown in Figure 4 where the usual 90° bend 25 is attached to the outlet box 8 and the BX cable 26 then connects the bend 25 to the junction box 20.

To permit a more shallow fixture than that shown in Figures 1 and 2, the modification shown in Figure 5, can be used. In Figures 1 and 2 the light bulb 11, when the reflector 5 is in a horizontal position, is also in the horizontal position. In Figure 5, it should be noted, that the outlet box 8 is merely a shield projecting from the surface of the reflector 5. It has an inlet made up of a BX 90° connector 25. To close the inner side of the outlet box 8, a plate 32 is hinged at 33 and held in position by the screw 34. This plate 32 completes the arcuate curves of reflector 5 and on its surface is positioned the bulb socket 35. In this type of construction, the light bulb placed in the socket 35 would be at an angle to the horizontal and would permit a more shallow reflector 5.

Any type of bezel carrying a diffusing or non-diffusing lens can be attached to the plaster frame 1. As the bezel comprises no part of this present invention and may be attached in many ways, it has not been displayed in the drawings.

In the operation of the present invention, when the bezel is open or removed, the latch 7 is released permitting the reflector 5 to drop into a vertical position. In this position, even though the plaster frame has been attached to the ceiling, the junction box can be moved on the telescopic members 15, 16 and 17, and locked into position by the set screws 18 and 19, by merely reaching through the opening left by the downward hanging reflector 5. A workman can complete connections in the junction box 20 as the side 40 of the junction box is readily removable by loosening the screws 41 and 42. The necessary electrical connections can then be made without disrupting the position of the fixture. Whenever it becomes necessary to make repairs to the wiring in the junction box, it is a simple matter to open the reflector 5, take off the cover 40 and proceed.

We claim:

1. In a recessed lighting fixture a plaster frame, an arcuate reflector closing said frame, a hinge pivotally connecting said reflector to said frame, a latch carried by said frame to hold said reflector parallel to said frame, said reflector pivoting on said hinge to leave said frame open, telescoping means carried on the top of said frame, a junction box attached to said telescoping means and being accessible from the exterior of said frame by opening said reflector.

2. In a recessed lighting fixture a plaster frame, an arcuate reflector closing said frame, a hinge pivotally connecting said reflector to said frame, a latch carried by said frame to hold said reflector parallel to said frame, said reflector pivoting on said hinge to leave said frame open, telescoping means carried on the top of said frame, a junction box attached to said telescoping means and being accessible from the exterior of said frame by opening said reflector, an outlet box extending through said reflector, a light bulb socket carried by said outlet box and extending through said reflector whereby an electric light bulb can be mounted under said reflector.

3. In a recessed lighting fixture a plaster frame, an arcuate reflector closing said frame, a hinge pivotally connecting said reflector to said frame, a latch carried by said frame to hold said reflector parallel to said frame, said reflector pivoting on said hinge to leave said frame open, telescoping means carried on the top of said frame, a junction box attached to said telescoping means and being accessible from the exterior of said frame by opening said reflector, an outlet box extending through said reflector, a light bulb socket carried by said outlet box and extending through said reflector whereby an electric light bulb can be mounted under said reflector, flexible protected means connecting said junction box and said socket.

References Cited in the file of this patent
UNITED STATES PATENTS

| | | |
|---|---|---|
| 2,323,073 | Netting | June 29, 1943 |
| 2,587,371 | Nettesheim | Feb. 26, 1952 |
| 2,602,881 | Pryne | July 8, 1952 |
| 2,741,695 | Schockett | Apr. 10, 1956 |